Figure 1:
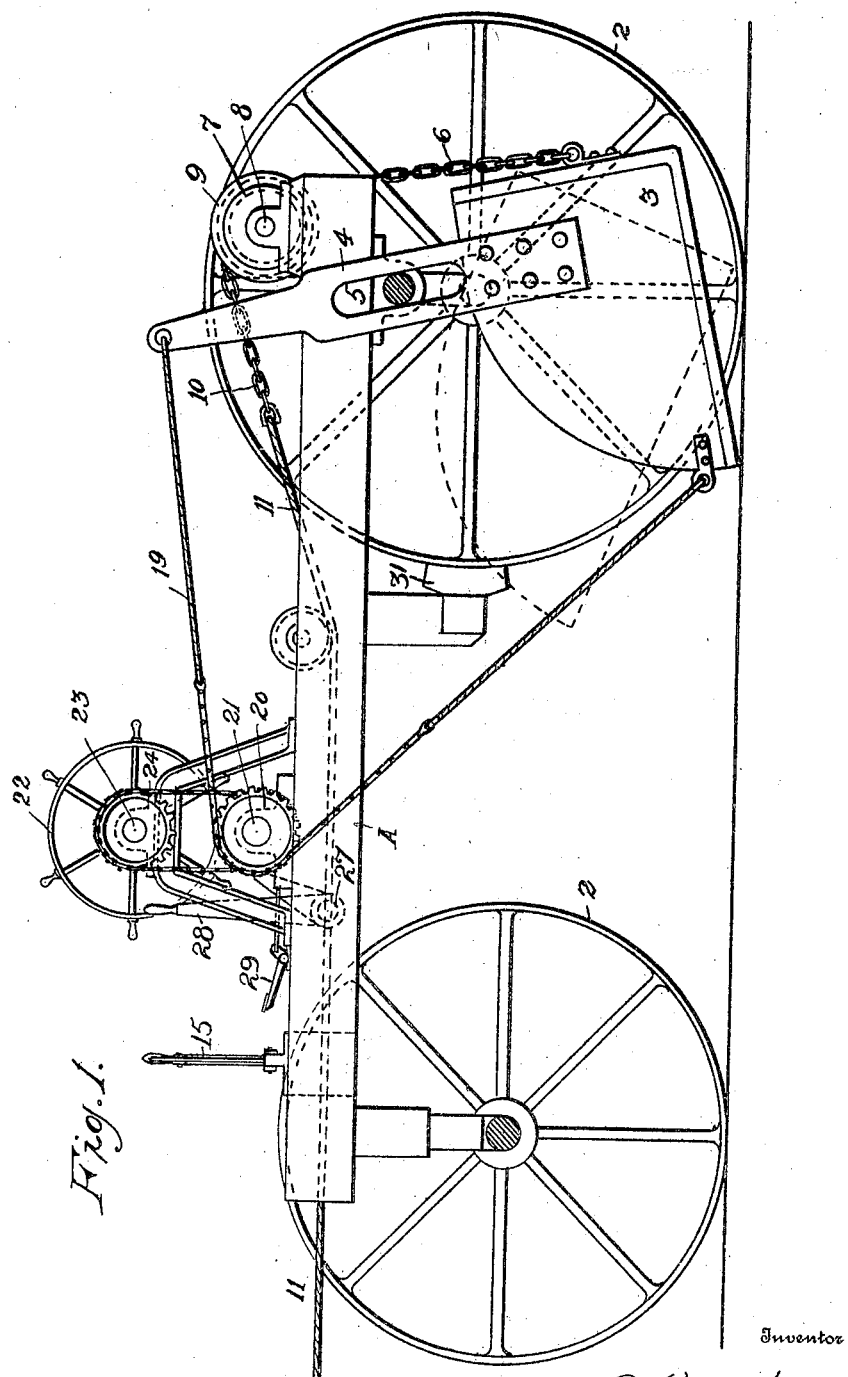

No. 818,140. PATENTED APR. 17, 1906.
H. P. BARKER.
SCRAPER.
APPLICATION FILED AUG. 29, 1905.

3 SHEETS—SHEET 1.

Witnesses

Inventor
Henry P. Barker
By Geo. H. Strong.
Attorney

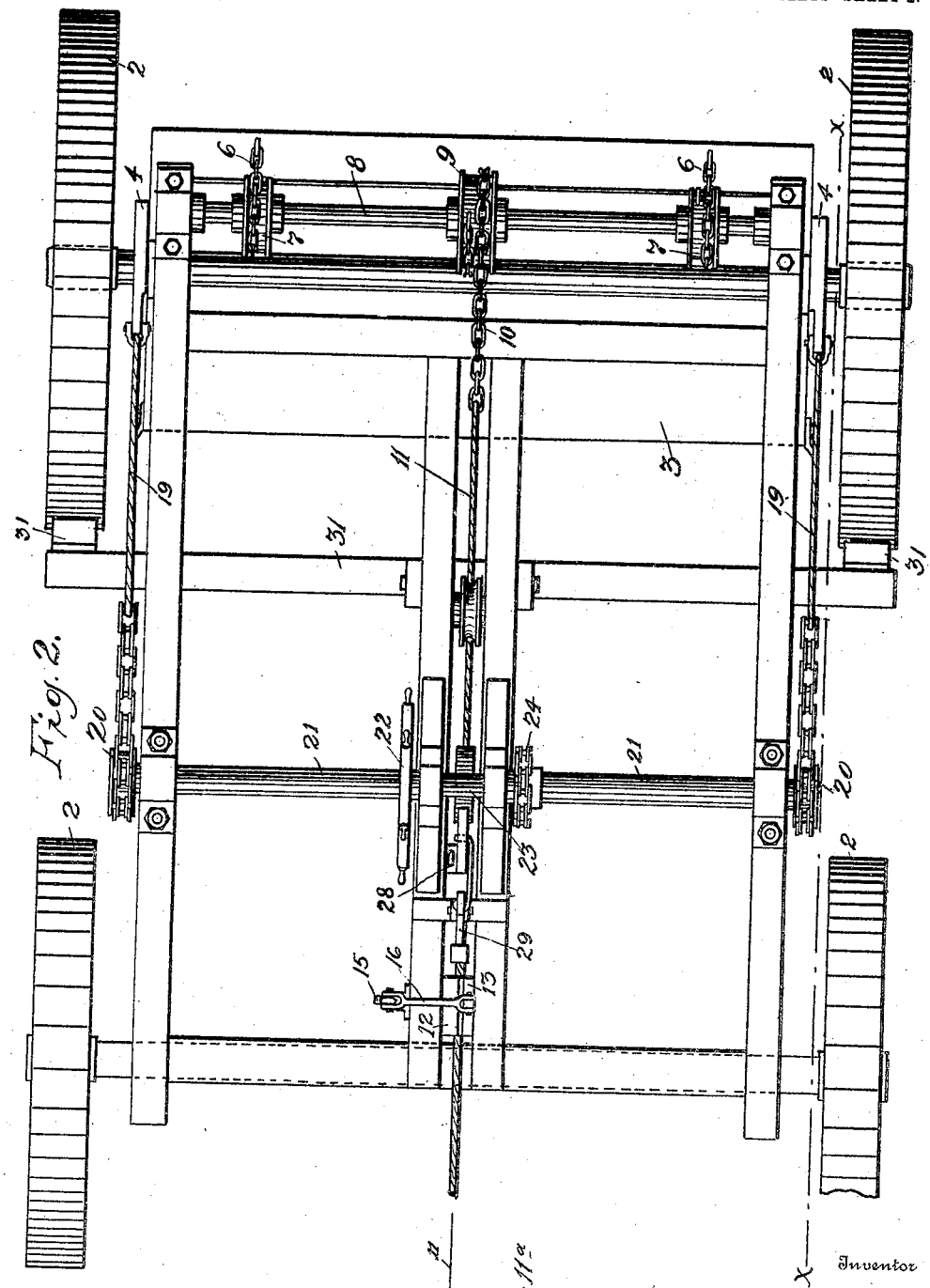

No. 818,140. PATENTED APR. 17, 1906.
H. P. BARKER.
SCRAPER.
APPLICATION FILED AUG. 29, 1905.
3 SHEETS—SHEET 3.
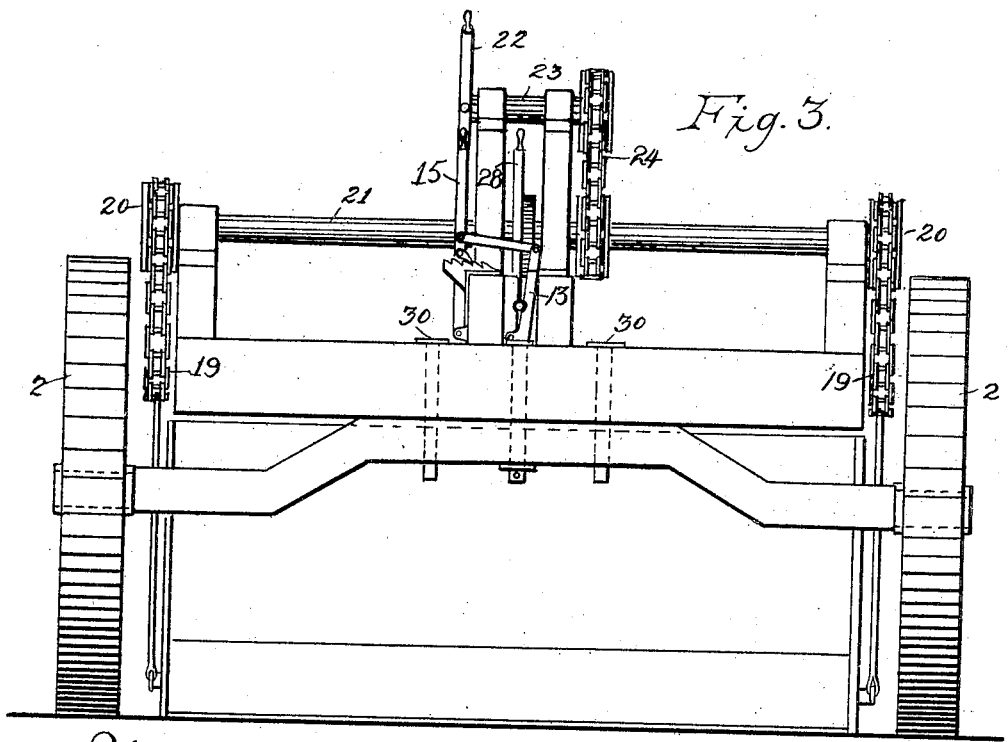
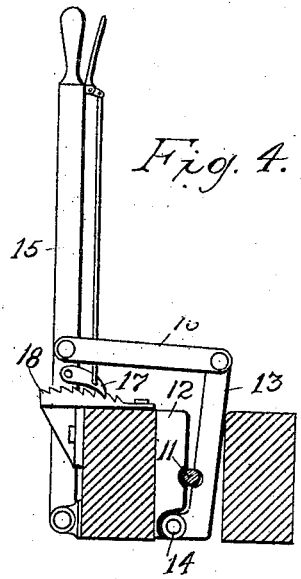
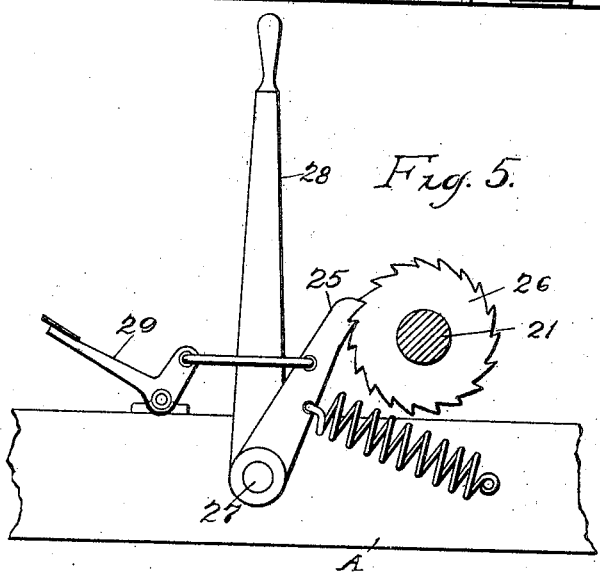
Inventor
Henry P. Barker
By Geo. H. Strong
Attorney
Witnesses

UNITED STATES PATENT OFFICE.

HENRY P. BARKER, OF MARYSVILLE, CALIFORNIA.

SCRAPER.

No. 818,140.  Specification of Letters Patent.  Patented April 17, 1906.

Application filed August 29, 1905. Serial No. 276,238.

*To all whom it may concern:*

Be it known that I, HENRY P. BARKER, a citizen of the United States, residing at Marysville, in the county of Yuba and State of California, have invented new and useful Improvements in Scrapers, of which the following is a specification.

My invention relates to scrapers for use in dredging, grading, and the like. Its object is to provide a simply-constructed practical scraper for the quick handling in large quantities of loose earth, sand, gravel, or gravel or sand and water in dredging, grading, &c.

The invention consists of the parts and the combination of parts, as hereinafter more fully described and claimed, having reference to the accompanying drawings, in which—

Figure 1 is a side elevation of my invention viewed from the line X X, Fig. 2. Fig. 2 is a plan view of the invention. Fig. 3 is a front end view of the same. Fig. 4 is a detail of the grip. Fig. 5 is a detail of the clutch.

A represents a frame or bed of suitable size, shape, and construction, preferably mounted on the wheels 2, and 3 is a scraper carried by the frame. The wheel-axles are preferably arched or bent upward between the wheels, so as to afford the necessary room for the proper operation of the scraper between the bed and the ground without unduly increasing the size of the wheels. This scraper is preferably closed at the bottom, back, and ends and open at the front and top. It is so mounted on the frame as to be capable of both a limited vertical and oscillating movement to permit it to be lowered below the wheel-tracks, as in gathering a load, or to be raised above the level of the tracks when it is desired to move the frame and transport it is desired to move the scraper and its load out of all contact with the ground, while the oscillatory or tilting movement of the scraper is desired for the purpose of assisting in the gathering of the load and the retention of the load in the scraper during transportation and in order to dump the load, all as will be hereinafter described.

I have here shown the scraper as carried by the rear axle and having the two upright standards or arms 4, longitudinally slotted, as at 5, to receive the rear axle, about which the scraper is adapted to fulcrum. The length of the slots 5 determines the amount of vertical movement of the scraper. The raising and lowering of the scraper is effected by suitable flexible connections, as the chains 6, attached to the back of the scraper and to drums or pulleys 7, fixedly secured to the shaft 8, which latter is arranged just above or proximate to the rear axle.

Intermediate of the drums 7 is a drum 9, around which is wrapped a suitable number of times and fixedly secured to the drum a chain 10, which connects to the cable 11. The cable 11 has the double function of a traction or inhaul line to move the frame and its load and of a dumping-line to cause the scraper to discharge its load. This cable is directed forward through the center of the machine in appropriate guides and is adapted to be engaged when it is desired to move the frame by suitable grip means, as shown in Fig. 4. This grip is here indicated as a plate 12, secured to a bed-timber, and a complementary movable member 13, pivoted to member 12 at 14. The opposed faces of the members 12 13 are appropriately concaved or otherwise adapted to suitably embrace and grip the cable when the member 13 is moved toward the member 12. The grip is operated by a suitable lever 15, arranged within convenient reach of the operator. The lever 15 is connected to the movable grip member 13 by a link 16, and the parts are held in any desired position by means of a pawl 17, engaging the rack 18. The cable 11 may be connected with a stationary engine $11^a$ or any suitable source of power or traction means.

The standards or arms 4 are rigidly connected to the scraper, and the upper ends of these arms and the bottom and front edge of the scraper are connected by cables or chains or chains and cables 19, as here shown, the chain portion of these flexible connections 19 passing over sprockets 20, mounted on a shaft 21, suitably journaled on frame A.

The rocking of the shaft 21 to tilt the scraper is done by means of a hand-wheel 22, fixed to the short shaft 23, which is connected to shaft 21 by a chain 24 and passing over respective sprockets on the shafts 21 23. In order to hold the scraper at any desired incline, I employ appropriate means, as the spring-pressed pawl 25, engaging the ratchet 26 on shaft 21. The pawl 25 is fixed to a rock-shaft 27, journaled in frame A, and this rock-shaft may be operated either by the hand-lever 28 or the foot-lever 29.

In practice the operation of the scraper is as follows: Where necessary, suitable trackways may be provided for the wheels over the space where excavation is to take place. If it is desired to reciprocate the apparatus back and forth along the same line, so as to pick up a load at one point and dump it at the other, the front axle may be locked rigid to the frame, so that it cannot turn on its king-bolt by suitable means, as the bolts or pins 30 passing through perforations in the frame and said axle. Of course when it is desired to move the device along the road or along any irregular path the pins 30 are withdrawn, so that the machine can be steered. By using broad tires, as I purpose doing, it will not always necessitate the laying of tracks. The steering mechanism for the front wheel may be of any appropriate construction, and as it forms no part of my invention I have not shown it here. The apparatus being arranged over or near to the point where it is desired to pick up the load, the grip 13 is released and tension on the cable 11 slackened to allow the scraper to drop down, and the pawl 25 is disengaged from the ratchet 26, so that the wheel 22 may be turned to cause the scraper to assume the desired angle. The grip 13 is then tightened on the cable 11, the engine, or horses, or other tractive power set in motion, and the frame and scraper are moved forward and the scraper made to gather its load. As soon as the load has been gathered the wheel 22 is turned, if necessary, to raise the front and lower edge of the scraper, so that the scraper will assume more or less of a trough shape. Grip 13 is temporarily released, while the winding-up or forward movement of the cable 11 is continued. Assuming this movement of the cable 11 when the grip 13 is released to be more rapid than the forward movement of the frame, the tendency is for the chain 10, which is wrapped around and secured to drum 9, to unwind and in turning to wind up the chains 6, which are attached to the drums 7, causing the scraper to be lifted. In case the weight of the frame or the friction of the wheels on the trackway is not sufficient to cause this unwinding of the chain extension 10 of the cable I may apply a suitable brake, as indicated at 31, and which brake may be operated from any convenient point and by any appropriate means. Where operating in very soft soil or mud or it is desired to lift up more or less water with the load, the scraper may be lifted and tilted by the combined action of the wheel 22, the flexible connections 19, the drum 9 and its connections into a trough-like position, as indicated in dotted lines in Fig. 1. With the scraper loaded and lifted the brakes may be released, and by continuing the pull on cable 11 the frame, with its load, will be moved to any suitable point where it is desired to dump. The dumping is effected by simply stopping the frame by applying the brakes or otherwise releasing the pawl 25 from ratchet 26 and continuing the pull on cable 11, which results in the dropping of the front of the scraper and the lifting of the back of the scraper, the latter turning about the rear axle as a fulcrum. The grip 13 need only to be used during the loading of the scraper. At all other times the traction may be direct on the drum 9, so that by the suitable appliance of the brakes and the hand-wheel 22 and ratchet 25 the lifting, tilting, and dumping can be quickly and safely effected. In fact, the scraper is self-dumping by simply throwing off the ratchet.

This apparatus combines the qualities of an ordinary scraper with that of a wheeled conveyer and is quickly adapted for work where there is more or less water, as well as on dry land.

It is possible that various modifications in my invention may be made without departing from the principle thereof, and I do not wish to be understood as limiting myself to the specific construction as herein shown and described.

Having thus described my invention, what I claim, and desire to secure by Letters Patent, is—

1. The combination of a wheeled frame, a scraper pivotally carried thereby, means for raising and lowering said scraper, means independent of the raising and lowering means and connecting with the scraper at each side of its pivot, for oscillating it, and means connected with the raising and lowering means for propelling the frame.

2. The combination of a wheeled frame, a scraper pivotally mounted thereon and having a limited vertical movement, means for positively raising or lowering the scraper, means independent of the raising and lowering means and connecting with the scraper at each side of its pivot, for positively turning the scraper on its pivots, means for locking the scraper in any desired position, and traction means for the frame connected with the scraper.

3. The combination of a portable frame, a vertically-adjustable scraper pivotally mounted thereon, said scraper open at the top and front, means connecting with the scraper at each side of its pivotal center for tilting said scraper to cause its bottom to assume different angles relative to the surface traversed, and means to raise and lower the scraper.

4. The combination of a frame, a scraper, slotted arms on the scraper and projecting beyond the pivotal center thereof, a part on the frame engaging the slots on said arms and forming a fulcrum for the scraper, means for raising and lowering the scraper, and means including a connection whose ends connect respectively with the slotted arms and with a part of the scraper on the opposite side of the pivotal center, and a rotatable member engaging an intermediate portion of the said connection, for holding the scraper in different tilted positions.

5. The combination with a wheeled frame, a scraper, slotted arms on the scraper with the rear axle of the frame engaging the slots in said arms and forming a fulcrum for the scraper, flexible connections between the arms and the scraper, sprockets around which said flexible connections pass, means for rotating said sprocket to tilt the scraper, and means to raise and lower the scraper.

6. The combination with a wheeled frame, of a vertically-adjustable scraper pivoted thereon, arms on said scraper, flexible connections between the arms and the scraper, sprockets around which said flexible connections pass, means for rotating the sprockets to rock the scraper, means for holding the scraper against rocking, and means connected with the scraper for raising the latter and also for propelling the frame.

7. The combination of a wheeled frame, a vertically-adjustable scraper pivoted thereon, means for rocking the scraper, means for preventing the rocking of the scraper, flexible connections between the scraper and a source of power for raising and lowering the scraper, and means on the frame to grip said flexible connections to propel the frame.

8. The combination of a wheeled frame, a scraper vertically adjustable and pivoted on the rear axle, arms on the scraper, flexible connections between the arms and the scraper, a sprocket around which said flexible connections pass, means for turning the sprocket to rock the scraper, means including a pawl-and-ratchet mechanism to prevent the rocking of the scraper, and traction means for the frame connected with the scraper and operating to dump the scraper on the release of said pawl-and-ratchet mechanism.

9. The combination of a wheeled frame, a scraper having slotted arms fulcruming and vertically adjustable on the frame, flexible connections between the arms and the scraper, sprockets around which said flexible connections pass, means for rotating the sprockets to rock the scraper, means for preventing the rocking of the scraper, a drum-shaft, flexible connections between said drum-shaft and the scraper, a traction-cable connected with the drum-shaft to rotate the latter, and grip means on the frame to engage the cable to propel the frame.

In testimony whereof I have hereunto set my hand in presence of two subscribing witnesses.

HENRY P. BARKER.

Witnesses:
ED. L. BORDWELL,
JOHN H. TRAYNER.